(12) United States Patent
Ruffa

(10) Patent No.: US 7,016,563 B1
(45) Date of Patent: Mar. 21, 2006

(54) FIBER OPTIC SWITCH

(75) Inventor: Anthony A. Ruffa, Hope Valley, RI (US)

(73) Assignee: The United States of America represented by the Secretary of the Navy, Washington, DC (US)

( * ) Notice: Subject to any disclaimer, the term of this patent is extended or adjusted under 35 U.S.C. 154(b) by 142 days.

(21) Appl. No.: 10/748,921

(22) Filed: Dec. 8, 2003

(51) Int. Cl.
  *G02B 6/26* (2006.01)
(52) U.S. Cl. .............................. 385/16; 385/22; 385/24; 385/140; 359/333
(58) Field of Classification Search ................... 385/16, 385/18, 24, 27; 359/337.21, 333, 110, 153, 359/115, 124, 337, 337.11, 341.32; 398/33
See application file for complete search history.

(56) References Cited

U.S. PATENT DOCUMENTS

| | | | | |
|---|---|---|---|---|
| 5,655,036 A | * | 8/1997 | Webb | ........................... 385/15 |
| 5,991,476 A | * | 11/1999 | Baney et al. | .................. 385/16 |
| 2003/0223104 A1 | * | 12/2003 | Kinoshita et al. | ........... 359/333 |
| 2005/0031343 A1 | * | 2/2005 | Stephens et al. | .............. 398/33 |

* cited by examiner

*Primary Examiner*—Frank G. Font
*Assistant Examiner*—Michael P. Mooney
(74) *Attorney, Agent, or Firm*—James M. Kasischke; Jean-Paul A. Nasser; Michael P. Stanley

(57) ABSTRACT

A method of switching from a single input optical fiber to one or more output fibers comprising the steps of providing an input signal into the input optical fiber, splitting the input signal and the input optical fiber to form a plurality of optical fibers and a plurality of split input signals each of the optical fibers carrying a single one of the plurality of the split input signals, attenuating the plurality of the split input signals, amplifying at least one of the plurality of the split input signals with a laser activated amplifier to produce at least one output signal, and outputting the at least one amplified split input signals through corresponding at least one output fibers.

9 Claims, 2 Drawing Sheets

FIBER OPTIC SWITCH

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATIONS

This patent application is co-pending with one related patent application entitled A FIBER OPTIC SWITCH EMPLOYING OPTICAL AMPLIFIERS (U.S. Ser. No. 10/748,922), by the same inventor as this application.

BACKGROUND OF THE PRESENT INVENTION (1) Field of the Invention

The present invention relates to a method for switching an optical input into a plurality of outputs and an apparatus for performing such switching. More specifically, the present invention relates to a method for switching an optical input into a plurality of outputs by means of a laser activated amplifier without requiring a conversion from an optical signal into an electrical signal.

(2) Description of the Prior Art

There exist numerous methodologies whereby optical signals may be switched from one fiber to another without first converting to an electronic signal and then back to an optical signal. Most of these methods involve some change in the medium to bend the light beam and achieve a physical switching of the input beam into two or more output beams. Some of the methods used include micro-electro-mechanical systems (MEMS), liquid crystals, tiny ink-jet bubbles, thermo-optical switches, tunable lasers, or using sound waves. As a result of requiring a change in the propagating medium to achieve switching, most of these switching methods have relatively slow switching speeds, e.g., on the order of 100 Hz.

What is needed is a methodology for switching an optical input into a plurality of outputs that does not depend upon the implementation of a change in medium giving rise to unacceptably slow switching speeds.

SUMMARY OF THE INVENTION

Accordingly, it is an object of the present invention to provide a method for switching an optical signal in a fiber optic assembly.

It is a further object of the present invention to provide a fiber optic switch for switching an optical signal in a fiber optic assembly.

In accordance with the present invention a method of switching from a single input optical fiber to two or more output fibers is provided. This method comprises the steps of providing an input signal into the input optical fiber and splitting the input signal and the input optical fiber to form a plurality of optical fibers and a plurality of split input signals, so that each of the optical fibers carries a single one of the split input signals. This method further comprises attenuating the split input signals, amplifying at least one of the split input signals with a laser activated amplifier to produce at least one output signal, and outputting the at least one amplified split input signals through corresponding at least one output fibers.

In accordance with the present invention a method of preserving the signal-to noise-ratio of an input signal in a fiber optic switch is provided. This method comprises the steps of providing an input signal to an input optical fiber and splitting the input signal into a first and second signal at a point. Next, the method involves splitting the first signal into a plurality of first output signals, attenuating the second signal, and splitting the second signal into a plurality of second output signals. Next, the method includes selectively amplifying each of the plurality of second output signals, and combining each the first plurality of output signals with one of the second plurality of output signals such that a total distance traveled by each of the plurality of first output signals differs by one half of the wavelength from a total distance traveled by each of the corresponding plurality of the second output signals.

In accordance with the present invention a fiber optic switch comprises an input optical fiber. An input signal is provided to the input optical fiber. At least one splitter is used to split the input signal and the input optical fiber to form a plurality of optical fibers and a plurality of split input signals. Each of the optical fibers carries a single split input signal. At least one attenuator is provided attenuating the split input signals. At least one amplifier controllably amplifies one of the split input signals to produce an output signal. A controller can be provided for activitating each amplifier.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT(S)

The optical switch of the present invention optically switches a signal from an input fiber to two or more output fibers in response to input laser sources that are turned on and off. The embodiments of the present invention, discussed more fully below, involve splitting an optical input signal into a plurality of signals, attenuating the split signals, and amplifying the split signals to provide an output signal corresponding to the optical input signal. In some instances, the attenuation of the split signal is accomplished through the diminution of the optical input signal which occurs when it is split while at other times the attenuation is achieved through the use of an attenuator.

The most common optical amplifier is the erbium doped optical fiber, which operates at wavelengths from 1530 to 1610 nm, which encompasses the 1550 nm band used for fiber optic transmission (where the fiber is most transparent).

Other optical amplifiers having different wavelengths and modes of operation can be used within the scope of this invention.

In any of the embodiments, the attenuators can be either a filter or partially opaque section of fiber. As is discussed below, the amount of attenuation required depends on how much amplification of the attenuated signal can take place without introducing so much noise that the digital information in the signal is corrupted.

Figure 1:
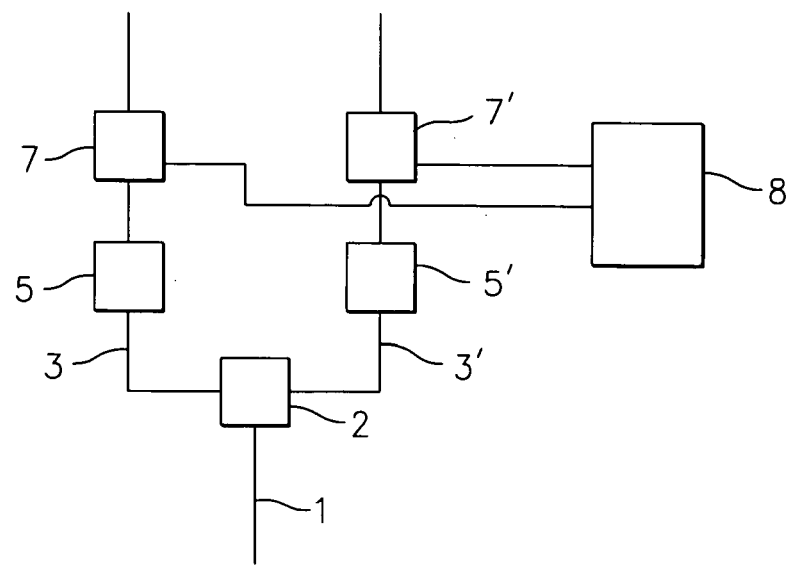
FIG. 1 provides a diagram of a fiber optic switch of the present invention.

With reference to FIG. 1, there is illustrated an embodiment of an optical switch of the present invention. The incoming signal to be switched is contained by fiber 1. The signal is split into two fibers 3, 3' with a splitter 2. A splitter 2 divides a single incoming optical signal into at least two separate output signals such that each output signal corresponds to the incoming signal but is scaled to a lower intensity by division of the signal power. In addition, each of the fibers 3 and 3' pass through an attenuator 5, 5' which has the effect of reducing the signal to a small, but finite intensity, low enough to be interpreted digitally as a "0" at its maximum magnitude.

Fibers 3, 3' each have an attached amplifier 7, 7'. Each amplifier 7, 7' amplifies the incoming signal in its respective fiber 3, 3' when a pumping laser (not shown) within the amplifier is turned on. As known in the art, these amplifiers can be constructed from doped fiber optic segments. The pumping laser can be electrically controlled or optically controlled by control 8. As a result of passing through an amplifier 7, 7', each signal is amplified from its attenuated intensity back to its original intensity, specifically, its intensity in fiber 1. Thus, if the signal is to be switched from fiber 1 to fiber 3, controller 8 would deliver a control signal to amplifier 7 activating its pumping laser to amplify the received signal. Conversely, if the signal is to be switched from fiber 1 to fiber 3', controller 8 would cause amplifier 7' to be powered by its laser. In addition, controller 8 can switch the signal to both fibers 3, 3' by powering pumping lasers in both amplifiers 7, 7'.

Figure 2:
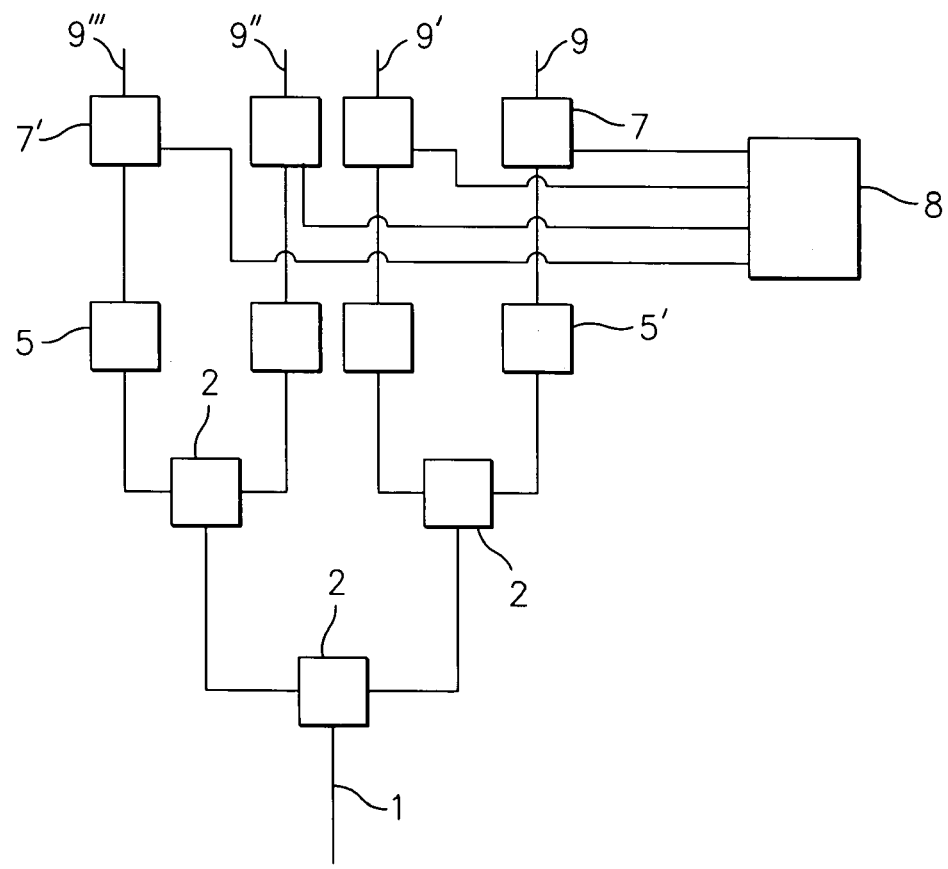
FIG. 2 provides a diagram of a fiber optic switch of the present invention illustrating multiple levels of binary switches.

This switch can be cascaded to switch an incoming signal to any desired number of fibers. FIG. 2 illustrates an incoming signal 1 that can be switched to any of four fibers 9, 9', 9", 9'" through the use of two levels of binary switches. As before, control 8 controls amplification at each amplifier 5. Note that it is not in general necessary to attenuate the signal and re-amplify it at each switch. Rather, amplifiers 7, 7', 7", 7'" are located only at the terminus output fibers 9, 9', 9", 9'". Similarly, the signal from an incoming fiber can be diverted optically to any of $2^n$ fibers by increasing the number of levels of binary switches.

Figure 3:
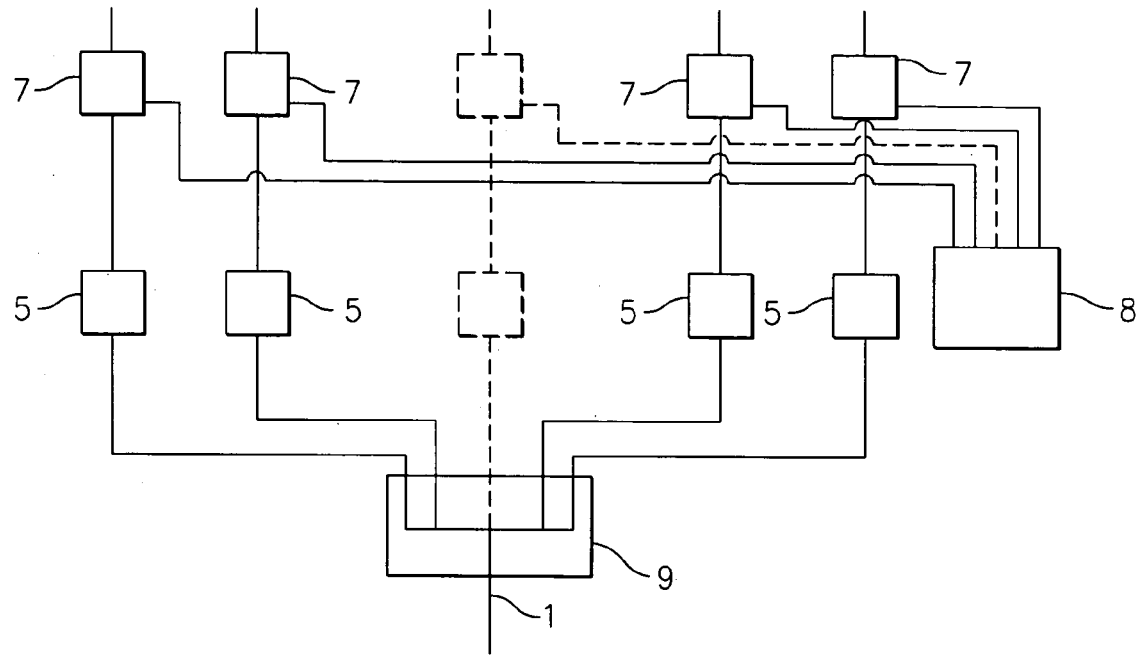
FIG. 3 provides a diagram of a configuration of the fiber optic switch of the present invention illustrating the extension to n output fibers.

FIG. 3 is a generalized embodiment of the present invention in which the signal in the input fiber is diverted into n output fibers. This can be performed by one or more splitters 9 creating the desired number of outputs. In such an embodiment, each output fiber typically contains an attenuator and an amplifier as in FIG. 1. However, if the incoming fiber is divided into a plurality of output fibers, it is possible that no attenuator is required as the intensity of the signal sent through the switch is reduced sufficiently by spreading it over enough output fibers.

The present invention requires the selection of numerous parameters. Referring to FIG. 1, at a minimum, the signal needs to be attenuated at 5 and 5' so that the signal intensity corresponding to a "1" is reduced below that corresponding to a "0". Ideally, the intensity corresponding to a "1" should be attenuated so that it is large compared to the optical noise floor, but lower than the high range for "0". In a preferred embodiment, a digital intensity standard is adapted having a sufficiently high intensity bound for "0" to support this requirement.

The fiber optic switch thus disclosed can be generalized for an arbitrary broadband signal, so that such a signal can be optically switched from an input fiber to a plurality of output fibers. As noted, the important parameters here are the signal-to-noise ratio (SNR) and the signal-to-noise floor ratio (SNFR). The noise floor is defined here as the optical noise present when there is no signal, i.e., the noise in "dark" fiber.

To illustrate the method, consider an example where the SNR is 1000 or 30 dB, and the SNFR is also 1000 or 30 dB. The input signal is first reduced in each of the output fibers by a factor of 1000, either through the use of attenuators, or by dividing the signal among output fibers, or by a combination of these. As a result, the SNR in each of the output fibers is now 1000 (or 30 dB), and the SNFR is also 30 dB (i.e., the noise power has been reduced to approximately that of the noise floor). Then, an erbium doped fiber amplifier (EDFA) is used to amplify the signals in the desired output fibers by 30 dB, or a factor of 1000. These are the output fibers that the input signal will be effectively switched to. The remaining fibers will not be amplified, so that the attenuated signal will have a power level equivalent to typical noise levels.

The EDFA works as follows. A section of fiber is doped with erbium ions so that when it is excited with a semiconductor pump laser, the ions emit photons that are identical to that of the original signal, having the effect of amplifying it.

This system has the property that "dark" fibers are not completely dark, in the sense that the noise level will be higher than the optical noise floor. The noise introduced can be reduced considerably, however, if the signal in the output fibers can be sufficiently attenuated before selective amplification (due to sufficiently low noise floor levels). For example, if the signal in each of the output fibers can first be attenuated to 10 dB below typical noise levels, this will have only a minimal effect on overall noise.

When the signal is injected into a "dark" fiber, and the noise level in the dark fibers is approximately equal to the noise injected along with the signal, then the total noise level will increase by a factor of $\sqrt{2}$. However, if the noise in the dark fiber is 10 dB below the noise injected, then the increase in the total noise level will be negligible (only about 0.5%).

If the noise in dark fibers has approximately the same level as typical noise levels, this will require an increased signal-to-noise ratio, because after N such switches, the noise level will increase by a factor of $\sqrt{N}$ relative to the signal. Also, any attenuated signal will have to be amplified before being injected into a "dark" fiber to preserve its SNR.

Figure 4:
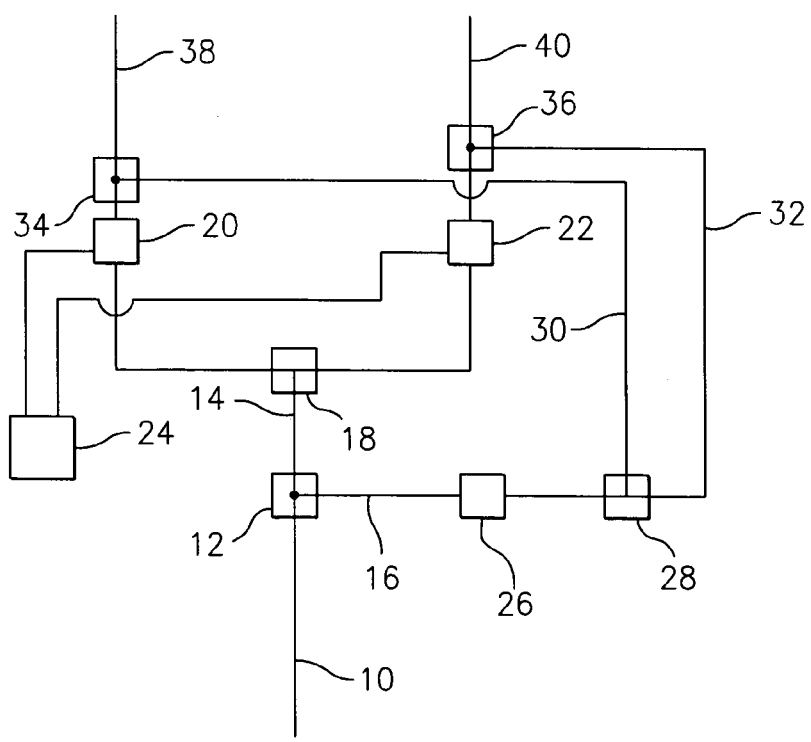
FIG. 4 provides an alternative embodiment of a fiber optic switch of the present invention.

In an alternative embodiment of the present invention, a further modification is made so that no additional noise is introduced into dark fibers and the SNR is preserved. This modification is illustrated with reference to FIG. 4. As previously described, the signal from an input fiber 10 is split by initial splitter 12 into output fiber 14 and cancellation processing fiber 16 as shown. Output fiber 14 is split by switching splitter 18 into two outputs which are joined to amplifiers 20 and 22. Amplifiers 20 and 22 are joined to a controller 24 which controls the pumping laser of the amplifiers 20 and 22. Each amplifier 20 and 22 has an amplified output. As before, the amplifier for the selected fiber is activated and the amplifier for the unselected fiber is deactivated.

This embodiment adds a cancellation component joined to cancellation processing fiber 16. The signal in fiber 16 is attenuated with an attenuator 26 so that after further processing its level matches the level in a unselected amplifier output. Cancellation processing attenuator output is then split by splitter 28 into cancellation output fibers 30 and 32. Adders 34 and 36 are joined to the amplified output of amplifiers 20 and 22. Adders 34 and 36 each have inputs which are summed into a single output 38 and 40, respectively. Cancellation output fiber 30 is connected to adder 34, and cancellation output fiber 32 is connected to adder 36. Cancellation output fibers 30 and 32 have the property that their total path length between splitter 12 and adder 34 and splitter 12 and adder 36 is one-half wavelength different than the path length from splitter 12 to amplifier output 20 and from splitter 12 to amplifier output 22. This path length difference results in cancellation of signals within adders 34 and 36 because opposite peaks of the same signals are combined.

Note that in this scheme, no noise is introduced into "dark" fibers to the extent that the signal is cancelled. Also, if the signal in fiber 30 or 32 is not amplified, its addition will have only the effect of canceling a small part of both the signal and noise in the selected output fiber, preserving the SNR. This approach, however, has the drawback of being limited to a single frequency. While this illustration involves only two output fibers, it can be generalized to an arbitrary number of output fibers.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method of switching from a single input optical fiber to at least two output fibers comprising the steps of:

providing an input signal into an input optical fiber;

splitting said input signal to form a plurality of split input signals wherein said plurality of said split input signals is reduced from a first intensity corresponding to a "1" below a second intensity corresponding to a "0";

amplifying at least one of said plurality of said split input signals with an amplifier to produce at least one output signal; and outputting said at least one amplified split input signals through corresponding at least one output fiber.

2. The method of claim 1 comprising the additional step of attenuating each of said plurality of said split input signals prior to said step of amplifying.

3. The method of claim 2 wherein attenuating each of said plurality of said split input signals comprises filtering said split input signals.

4. The method of claim 2 wherein attenuating said plurality of said split input signals comprises the step of passing said split input signals through a partially opaque section of fiber.

5. The method of claim 1 wherein said amplifier is an erbium doped optical fiber pumped by a laser.

6. The method of claim 1, further comprising the step of simultaneously switching said signals at multiple frequencies from a single input fiber to at least two output fibers.

7. The method of claim 1 wherein said splitting said input signal is repeated in binary fashion N times to produce $2^N$ optical fibers.

8. A fiber optic switch comprising:

an input optical fiber capable of transmitting an input signal;

a first splitter joined to said input optical fiber having a main output and a cancellation processing output;

at least one second splitter joined to said first splitter main output for splitting said main output to form a plurality of split optical fibers, each of said split optical fibers being capable of carrying a copy of said input signal;

at least one amplifier joined to each of said plurality of said split optical fibers, each amplifier being controllable to produce at least one output signal at an amplifier output;

at least one adder having a signal input, cancellation input and a summed output, said adder signal input being joined to one said amplifier output; and a third splitter joined to said first splitter cancellation processing output having a plurality of outputs corresponding to each said adder;

wherein a first path is defined from said first splitter main output through said second splitter, said at least one amplifier to said adder signal input; and a second path is defined from said first splitter through said third splitter to said adder cancellation input; said first path differing from said second path by one-half wavelength of the input signal.

9. The switch of claim 8, further comprising an attenuator interposed between said first splitter and said third splitter.

* * * * *